US010013032B1

(12) United States Patent
Ferris et al.

(10) Patent No.: US 10,013,032 B1
(45) Date of Patent: Jul. 3, 2018

(54) CURRENT BALANCING CIRCUIT FOR MULTIPLE SUPPLY VOLTAGE SYSTEMS

(71) Applicant: Western Digital Technologies, Inc., Irvine, CA (US)

(72) Inventors: Timothy A. Ferris, Mission Viejo, CA (US); Jaesoo Byoun, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/723,558

(22) Filed: Oct. 3, 2017

(51) Int. Cl.
| | |
|---|---|
| *H02J 1/14* | (2006.01) |
| *G06F 1/18* | (2006.01) |
| *G06F 1/26* | (2006.01) |
| *G06F 1/28* | (2006.01) |
| *G06F 11/22* | (2006.01) |
| *H02M 1/00* | (2006.01) |

(52) U.S. Cl.
CPC ............. *G06F 1/189* (2013.01); *G06F 1/263* (2013.01); *G06F 1/266* (2013.01); *G06F 1/28* (2013.01); *G06F 11/2221* (2013.01); *H02J 1/14* (2013.01); *H02M 2001/008* (2013.01)

(58) Field of Classification Search
CPC ....... H02M 2001/008; H02M 2001/009; H02J 2001/008; H02J 2001/106; H02J 1/14; H02J 9/00; H02J 9/02; G06F 1/28
See application file for complete search history.

(56) References Cited

U.S. PATENT DOCUMENTS

| | | | |
|---|---|---|---|
| 7,002,263 B2 | 2/2006 | Inn et al. | |
| 7,332,832 B2* | 2/2008 | Rowan ................. | G11B 33/122 307/43 |
| 8,767,354 B1 | 7/2014 | Ferris et al. | |
| 9,690,346 B1 | 6/2017 | Bucher, II | |
| 2008/0111423 A1 | 5/2008 | Baker et al. | |
| 2014/0108846 A1 | 4/2014 | Berke et al. | |
| 2014/0321167 A1 | 10/2014 | Klein | |
| 2016/0380455 A1* | 12/2016 | Greening .............. | H02J 7/0044 320/114 |

* cited by examiner

*Primary Examiner* — Harry Behm

(57) ABSTRACT

A current balancing circuit is disclosed comprising a first current detector configured to measure a first current flowing from a first supply voltage to a first load, and a second current detector configured to measure a second current flowing through an inductor from a second supply voltage to the first load. The first current is compared to a first threshold to generate an error signal, and the error signal is amplified by a gain to generate a second threshold. When the first current is above the first threshold and the second current is below the second threshold, a first switch is controlled to connect a first end of the inductor to the second supply voltage. When the second current is above the second threshold, a second switch is controlled to connect the first end of the inductor to a current sink.

19 Claims, 8 Drawing Sheets

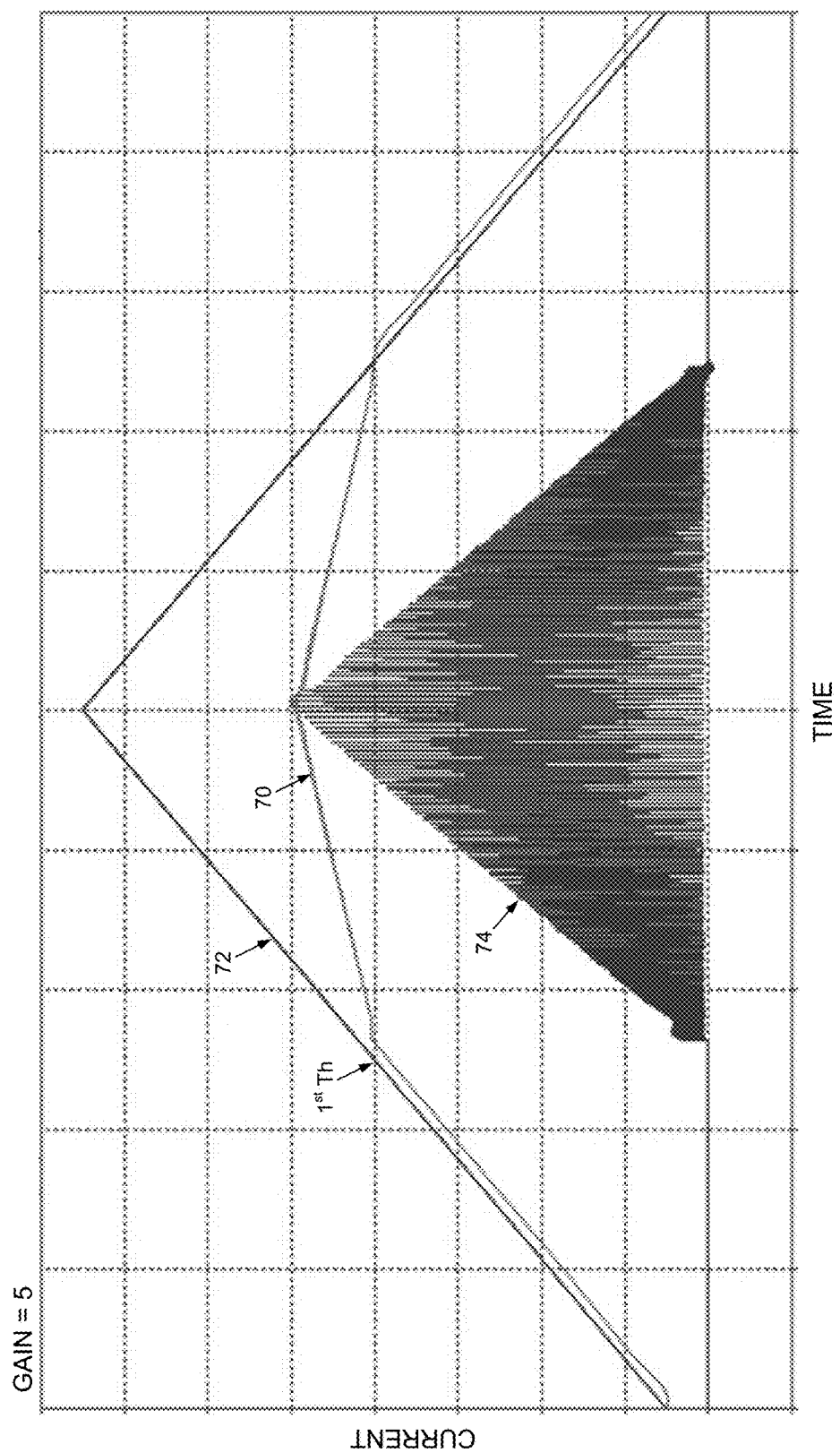

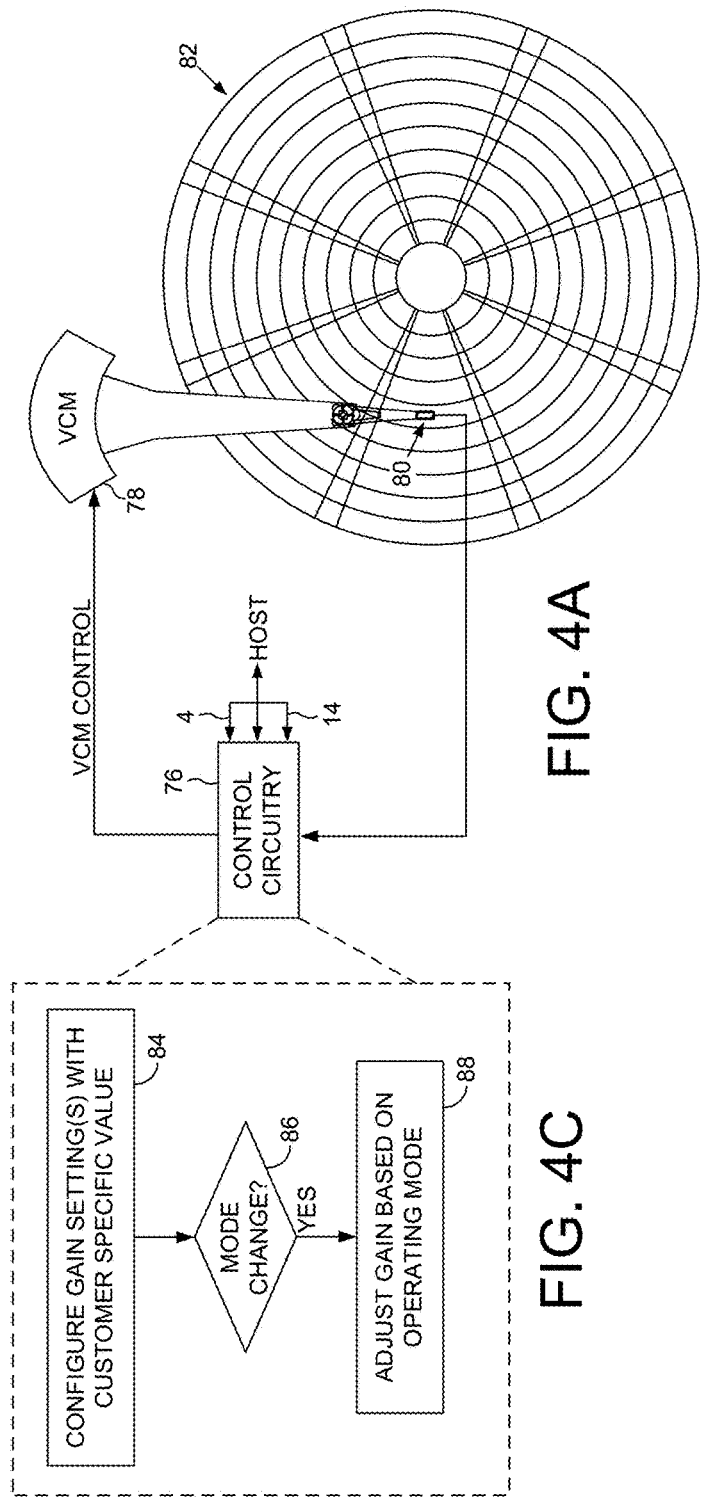
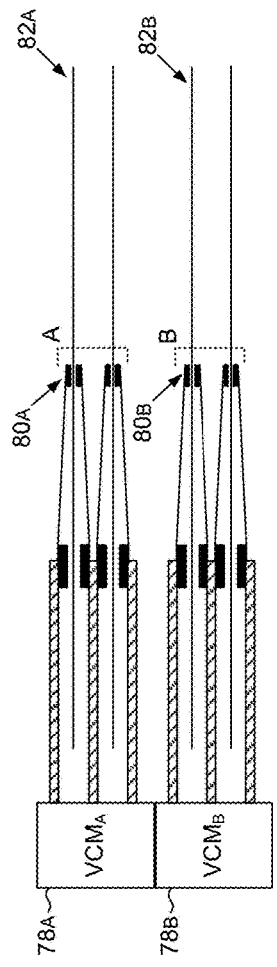
FIG. 4A
FIG. 4C
FIG. 4B

CURRENT BALANCING CIRCUIT FOR MULTIPLE SUPPLY VOLTAGE SYSTEMS

BACKGROUND

Electronic device such as data storage devices may operate based on multiple supply voltages. For example, a disk drive may receive a first supply voltage used to power control circuitry such as microprocessor or a preamp circuit, and a second, higher supply voltage used to power the actuator system that actuates the head over the disk and power the spindle motor that rotates the disk. An electronic device is typically designed to meet certain customer design constraints, such as a maximum current or power that may be drawn from each supply voltage, or a maximum ripple current allowed on each supply voltage line. For example, an electronic device may be connected to a supply voltage of a host computer that also powers other peripheral devices using the same supply voltage. If the electronic device exceeds the specified constraints of the supply voltage, it may adversely affect the operation of the other peripheral devices and/or the operation of the host computer.

BRIEF DESCRIPTION OF THE DRAWINGS

FIGS. 3A-3C show time traces of the first current drawn from the first supply voltage by the load, the total load current, and the inductor current used to supplement the first current at different gain settings according to an embodiment.

FIG. 4A shows a data storage device in the form of a disk drive according to an embodiment comprising a head actuated over a disk, and control circuitry comprising the current balancing circuit.

FIG. 4B shows an embodiment wherein the disk drive comprises a split actuator system for simultaneously actuating two heads over respective disk surfaces.

FIG. 4C is a flow diagram according to an embodiment wherein the gain of the current balancing circuit may be adjusted based on an operating mode of the disk drive.

DETAILED DESCRIPTION

Figure 1A:
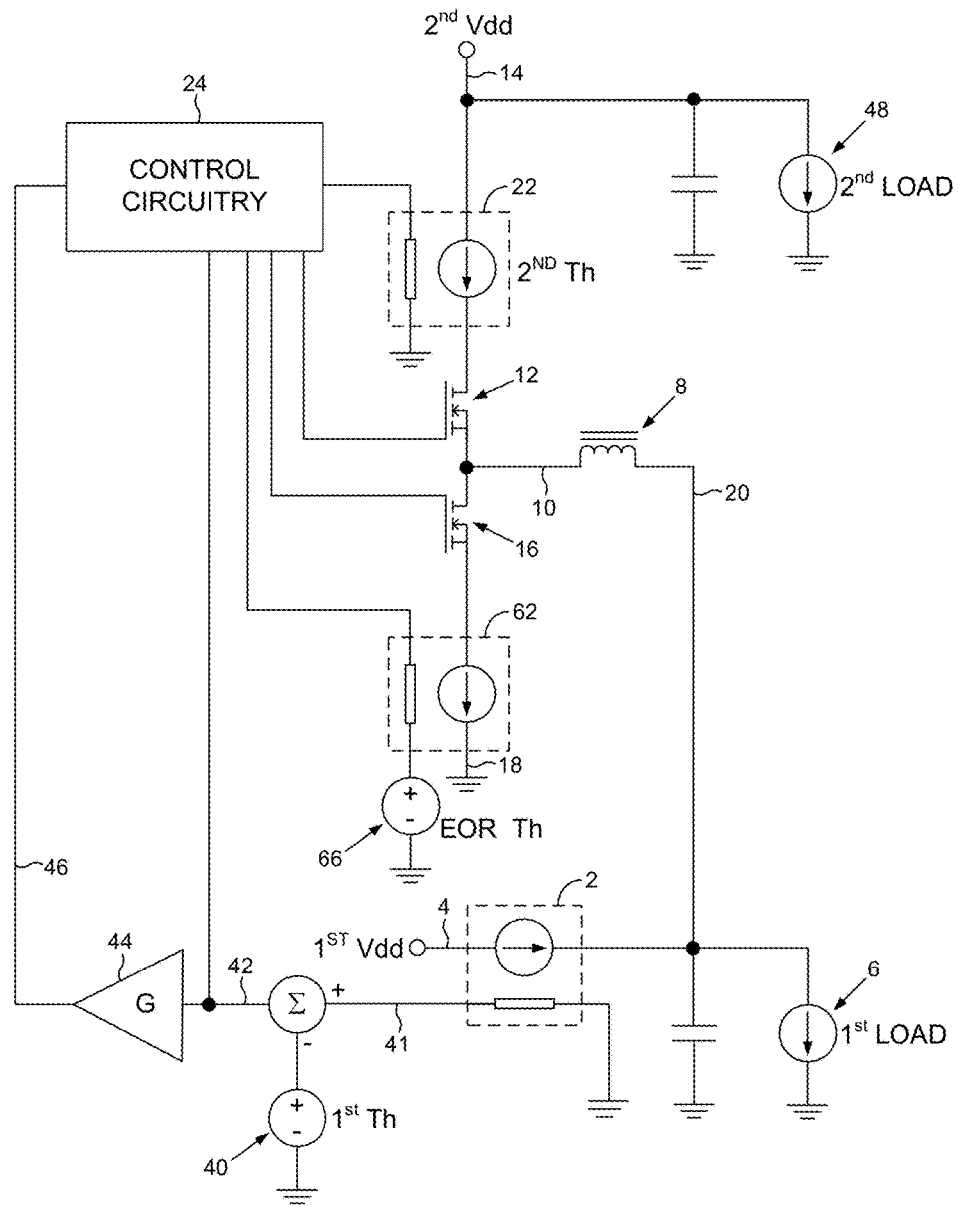
FIG. 1A shows a current balancing circuit according to an embodiment wherein a first current drawn from a first supply voltage is supplemented with a second current drawn from a second supply voltage based on a gain setting, thereby balancing the currents to prevent either current from exceeding a design constraint.
Figure 1B:
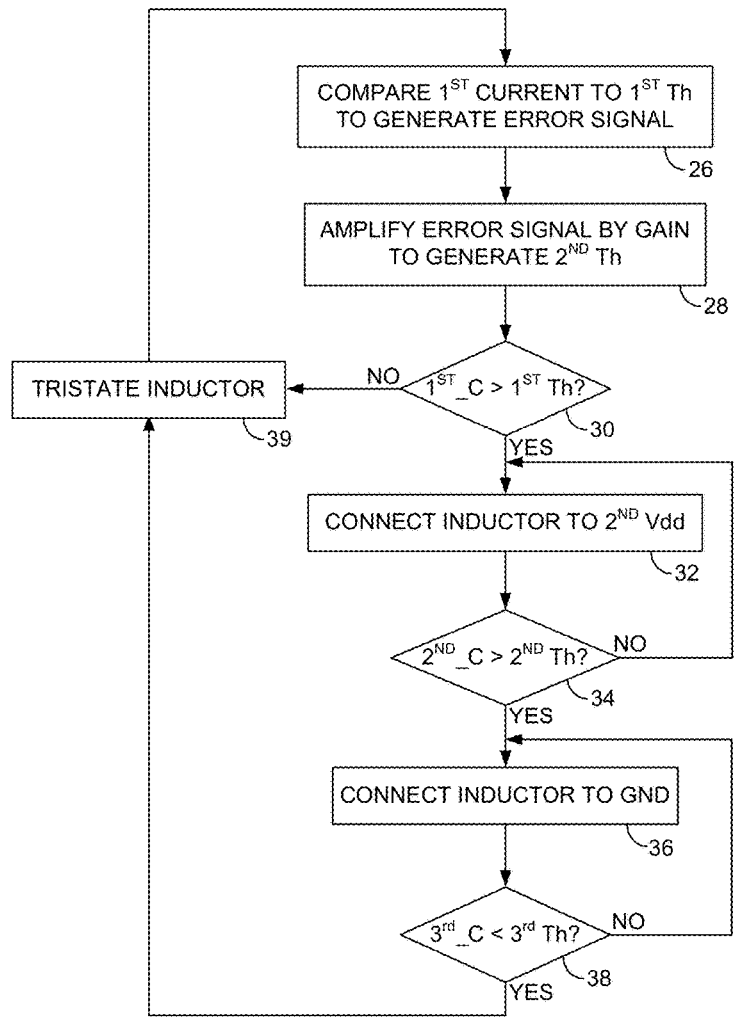
FIG. 1B is a flow diagram according to an embodiment, wherein an error signal is generated based on a difference between the first current and a first threshold, a second threshold is configured by amplifying the error signal by a gain, and the amount of current supplemented from the second supply voltage is based on the second threshold.

FIG. 1A shows a current balancing circuit according to an embodiment comprising a first current detector 2 configured to measure a first current flowing from a first supply voltage 4 to a first load 6. An inductor 8 comprises a first end 10 coupled through a first switch 12 to a second supply voltage 14 and coupled through a second switch 16 to a current sink 18, wherein a second end 20 of the inductor 8 is coupled to the first load 6. A second current detector 22 is configured to measure a second current flowing through the inductor 8 from the second supply voltage 14 to the first load 6. The current balancing circuit further comprises control circuitry 24 configured execute the flow diagram of FIG. 1B, wherein the first current is compared to a first threshold to generate an error signal (block 26), and the error signal is amplified by a gain to generate a second threshold (block 28). When the first current rises above the first threshold (block 30), the first switch is controlled to connect the first end of the inductor to the second supply voltage (block 32), and when the second current rises above the second threshold (block 34), the second switch is controlled to connect the first end of the inductor to the current sink (block 36). When a third current flowing through the inductor to the first load (recirculation inductor current) falls below a third threshold (block 38), both switches are opened in order to tristate the inductor (block 39), and the flow diagram is repeated from block 26. When the first current falls below the first threshold at block 30, the current balancing circuit is disabled by keeping the inductor in the tristate mode at block 39.

In the embodiment of FIG. 1A, the first current detector 2 outputs a voltage 41 representing the first current flowing from the first supply voltage 4 to the first load 6. A first threshold voltage 40 is subtracted from voltage 41 to generate the error signal 42 that is amplified by a gain 44 to generate a voltage 46 representing the second threshold used to control the state of the switches 12 and 16. In one embodiment, the control circuitry 24 controls the switches 12 and 16 so as to implement a buck converter that supplements the current provided to the first load 6. In the embodiment shown in FIG. 1A, the second supply voltage 14 is higher than the first supply voltage 4 and is used to power a second load 48. For example in an embodiment where the electronic device employing the current balancing circuit is a disk drive, the first supply voltage 4 may be a 5 v supply voltage used to power control circuitry such as a microprocessor or a preamp circuit, and the second, higher supply voltage may be a 12 v supply voltage used to power the actuator system that actuates the head over the disk and power the spindle motor that rotates the disk. During certain operating modes, the first load 6 may draw more current than can be provided by the first supply voltage 4, in which case the current balancing circuit is enabled to supplement the current supplied to the first load 6.

In one embodiment, the amount of current supplemented to the first load 6 is controlled based on the error signal 42 so as to be proportional to the amount of current needed by the first load 6. In this manner, the transients affecting the first supply voltage 4 when the current balancing circuit is enabled/disabled is reduced. In one embodiment, the gain 44 of the current balancing circuit may determine various operating characteristics, such as how aggressive the current drawn by first load 6 may be supplemented by current from the second load 14, thereby controlling the peak current drawn from the first supply voltage 4 by the first load. The gain 44 may also affect the stability of the current balancing circuit and resulting ringing in the currents that may happen at higher gains for both the first and second supply voltages 4 and 14.

Figure 2A:
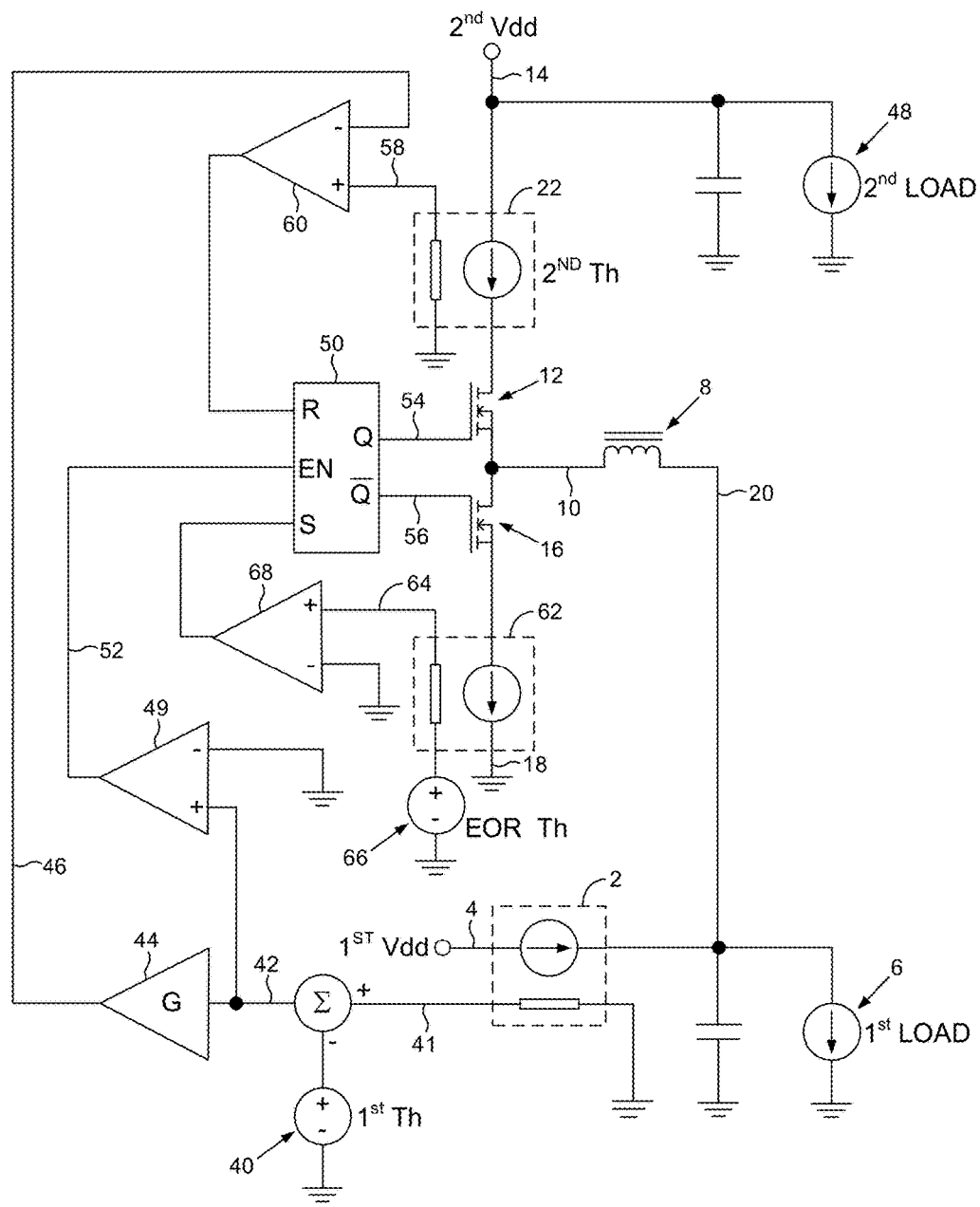
FIG. 2A shows control circuitry according to an embodiment comprising an S/R register for controlling first and second switches that connect a first end of an inductor either to the second supply voltage or to ground based on whether the inductor current exceeds the second threshold.

FIG. 2A shows an embodiment for the control circuitry 24 of FIG. 1A for controlling the switches 12 and 16 to implement a buck converter. When the voltage 41 representing the current flowing from the first supply voltage 4 rises above the first threshold voltage 40, comparator 49 enables the current balancing circuit by enabling a S/R register 50 over line 52. When the S/R register 50 is enabled, the non-inverting output 54 is high which turns on switch 12 to connect the first end 10 of the inductor 8 to the second supply voltage 14, and the inverting output 56 is low which turns off switch 16. When the current flowing through the inductor 8 from the second supply voltage 14 (represented as voltage 58) rises above the second threshold 46, comparator 60 resets the S/R register 50 which turns switch 12 off and turns switch 16 on, thereby connecting the first end 10 of the inductor 8 to ground 18. While the first end 10 of the inductor 8 is grounded, a recirculation current flows from the inductor 8 to the first load 6. A current detector 62 converts this recirculation current into a negative voltage 64 that is compared to a positive end-of-recirculation (EOR) threshold 66. When the recirculation current falls such that the absolute value of the negative voltage 64 is less than the positive EOR threshold 66, comparator 68 sets the S/R register 50 which turns switch 16 off and turns switch 12 on, thereby reconnecting the first end 10 of the inductor 8 to the second supply voltage 14. This sequence is then repeated until the voltage 41 representing the current flowing from the first supply voltage 4 falls below the first threshold voltage 40, at which time comparator 49 disables the current balancing circuit by disabling the S/R register 50.

Figure 2B:
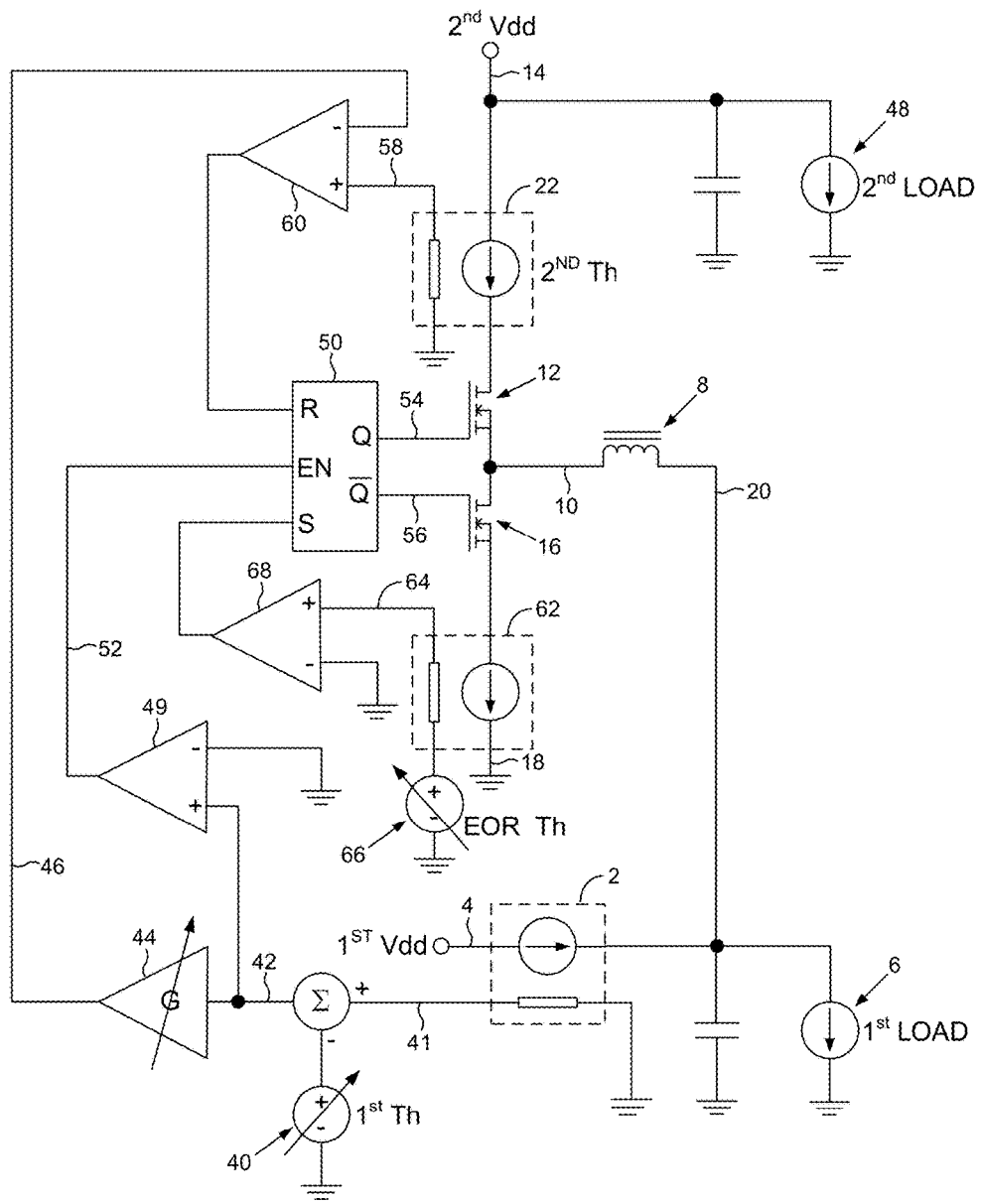
FIG. 2B shows a current balancing circuit according to an embodiment wherein various components are programmable, for example, based on an operating mode of the electronic device.

In one embodiment shown in FIG. 2B, the gain 44 and/or one or more of the thresholds 40 and 66 may be adjustable by the electronic device employing the current balancing circuit. For example, in one embodiment these parameters may be configured based on the design specifications of a particular host. That is, in one embodiment the electronic device may be connected to one of a number of different host types, and therefore the parameters may be configured based on which type of host the electronic device is connected. In another embodiment, the parameters of the current balancing circuit may be adjusted based on an operating mode of the electronic device. For example, the electronic device employing the current balancing circuit may draw different levels of current at different rates during different operating modes, and therefore the parameters may be adjusted so that the current balancing circuit performs optimally under different operating conditions.

Figure 3B:
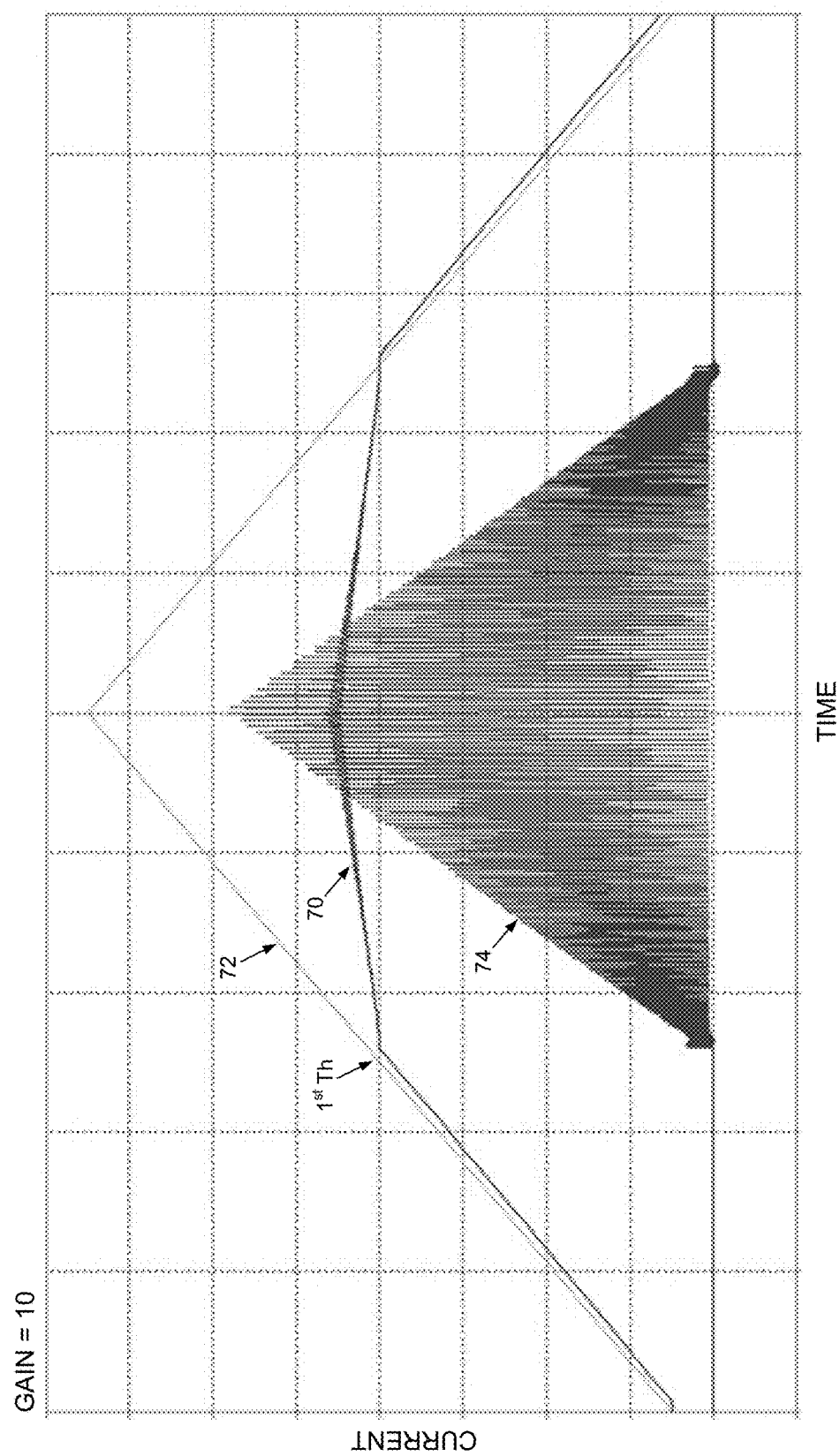
Figure 3C:
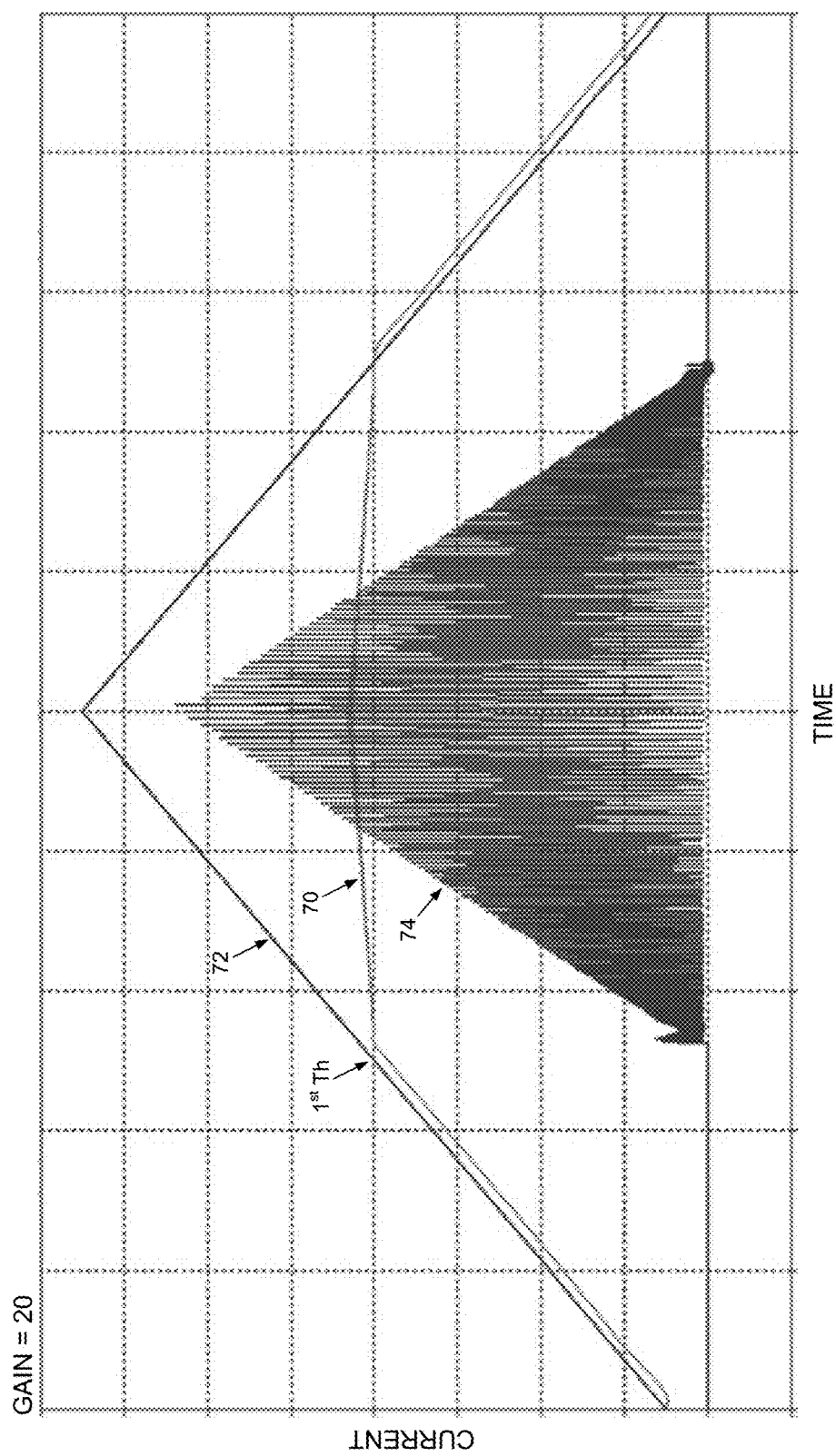

FIG. 3A is a time trace of the current balancing circuit when the gain 44 is set to 5, including the first current 70 drawn from the first supply voltage 4 by the first load 6, the total current 72 drawn by first load 6, and the inductor current 74 used to supplement the first current 70. FIGS. 3B and 3C show similar time traces for a gain 44 setting of 10 and 20, respectively. These time traces illustrate that at lower gain settings, the current drawn by the first load 6 may be supplemented less aggressively by the current from the second supply 14, which may increase the stability of the circuit (reduce ringing in both of the supply currents) but also increase the peak current drawn from the first supply 4. In one embodiment, the gain 44 setting may be configured based on the stability and peak current constraints of the host system.

FIG. 4A shows an electronic device in the form of a disk drive comprising control circuitry that includes the current balancing circuit according to an embodiment. In this embodiment, the control circuitry 76 receives a first supply voltage 4 (e.g., a 5 v supply) used to power integrated circuits, such as a microprocessor or a preamp circuit, and receives a second supply voltage 14 (e.g., 12 v supply) used to power a voice coil motor (VCM) 78 for actuating a head 80 over a disk 82 (a non-volatile storage medium) and used to power a spindle motor (not shown) for rotating the disk 82. In an embodiment shown in FIG. 4B, the disk drive may utilize a split-actuator design wherein a first VCM $78_A$ actuates a first plurality of heads $80_A$ over respective disk surfaces $82_A$, and a second VCM $78_B$ actuates a second plurality of heads $80_B$ over respective disk surfaces $82_B$. This split-actuator design may enable the control circuitry 76 to execute access operations (write/read) to concurrently access multiple disk surfaces.

The disk drive of FIG. 4A may transition into different operating modes, such as an idle mode when not accessing any disk surface, and an access mode which may include accessing a single disk surface or concurrently accessing multiple disk surfaces. Depending on the operating mode, the amount of current required to power the first load 6 (e.g., integrated circuits of the disk drive) may vary, and in one embodiment, exceed the design specifications of the first supply voltage 4. For example, concurrently reading multiple disk surfaces may significantly increase the current drawn by the first load 6 due to multiple read channel circuits concurrently processing multiple read signals. When this happens, the current balancing circuit may be enabled so as to supplement the current from the first supply voltage 4 as described above. In one embodiment, the disk drive control circuitry 76 may configure the gain 44 of the current balancing circuit based on the operating mode of the disk drive in order to facilitate different current demands from the first load 6. This embodiment is understood with reference to the flow diagram of FIG. 4C, wherein the gain setting(s) of the current balancing circuit may be configured with values that will satisfy a customer specific design specification with respect to the current drawn from the supply voltages (block 84). When the operating mode of the disk drive changes (block 86), such as transitioning from an idle mode to concurrently accessing multiple disk surfaces, the gain setting of the current balancing circuit is adjusted based on the operating mode (block 88).

In the embodiments described above, the current balancing circuit may be implemented using any suitable analog and/or discrete-time circuitry. The embodiment shown in FIG. 2A shows a hybrid analog/digital design utilizing analog comparator circuits and an analog gain amplifier, in combination with a digital S/R register. However, other embodiments may utilize different circuit configurations, including different combinations of analog/digital circuitry. For example, in one embodiment the voltages representing the sensed currents may be sampled using a suitable analog-to-digital converter, and the digital values processed by a microprocessor. In this embodiment, the gain 44 of the current balancing circuit may also be implemented as a digital value within the microprocessor. The microprocessor may execute instructions of a computer program, the instructions being operable to cause the microprocessor to perform the flow diagrams described herein.

The current balancing circuit may be employed in any suitable electronic devices, such as computing devices, data server devices, media content storage devices, or any suitable data storage devices. Suitable data storage devices may include a disk drive such as shown in FIG. 4A, wherein the disk may comprise any suitable medium, such as a magnetic or optical medium. Other suitable data storage devices may include magnetic tape drives, solid state drives, hybrid drives, etc.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A current balancing circuit comprising:
   a first current detector configured to measure a first current flowing from a first supply voltage to a first load;
   an inductor comprising:
      a first end coupled through a first switch to a second supply voltage and coupled through a second switch to a current sink; and
      a second end coupled to the first load;
   a second current detector configured to measure a second current flowing through the inductor from the second supply voltage to the first load; and
   control circuitry configured to:
      compare the first current to a first threshold to generate an error signal;
      amplify the error signal by a gain to generate a second threshold;
      when the first current is above the first threshold and the second current is below the second threshold, control the first switch to connect the first end of the inductor to the second supply voltage; and
      when the second current is above the second threshold, control the second switch to connect the first end of the inductor to the current sink.

2. The current balancing circuit as recited in claim 1, further comprising a third current detector configured to measure a third current flowing through the inductor to the first load when the first end of the inductor is connected to the current sink, wherein when the third current is below a third threshold the control circuitry is further configured to control the second switch to disconnect the first end of the inductor from the current sink.

3. The current balancing circuit as recited in claim 2, wherein the third threshold is programmable.

4. The current balancing circuit as recited in claim 1, wherein when the first current is below the first threshold, the control circuitry is further configured to control the first switch and the second switch in order to disconnect the first end of the inductor from the second supply voltage and the current sink.

5. The current balancing circuit as recited in claim 1, wherein the first supply voltage is lower than the second supply voltage.

6. The current balancing circuit as recited in claim 1, wherein the first threshold is programmable.

7. The current balancing circuit as recited in claim 1, wherein the second threshold is programmable.

8. The current balancing circuit as recited in claim 1, wherein gain is programmable.

9. The current balancing circuit as recited in claim 1, wherein the second supply voltage is configured to supply current to a second load.

10. A data storage device comprising:
    a non-volatile storage medium;
    a first current detector configured to measure a first current flowing from a first supply voltage to a first load;
    an inductor comprising:
       a first end coupled through a first switch to a second supply voltage and coupled through a second switch to a current sink; and
       a second end coupled to the first load;
    a second current detector configured to measure a second current flowing through the inductor from the second supply voltage to the first load; and
    control circuitry configured to:
       compare the first current to a first threshold to generate an error signal;
       amplify the error signal by a gain to generate a second threshold;
       when the first current is above the first threshold and the second current is below the second threshold, control the first switch to connect the first end of the inductor to the second supply voltage; and
       when the second current is above the second threshold, control the second switch to connect the first end of the inductor to the current sink.

11. The data storage device as recited in claim 10, wherein gain is programmable.

12. The data storage device as recited in claim 11, wherein the control circuitry is further configured to adjust the gain based on an operating mode.

13. A method of balancing current in an electronic device, the method comprising:
    measuring a first current flowing from a first supply voltage to a first load;
    comparing the first current to a first threshold to generate an error signal;
    amplify the error signal by a gain to generate a second threshold;
    measuring a second current flowing through an inductor from a second supply voltage to the first load;
    when the first current is above the first threshold and the second current is below the second threshold, controlling a first switch to connect a first end of the inductor to the second supply voltage; and
    when the second current is above the second threshold, controlling a second switch to connect the first end of the inductor to a current sink.

14. The method as recited in claim 13, further comprising:
    measuring a third current flowing through the inductor to the first load when the first end of the inductor is connected to the current sink; and when the third current is below a third threshold, controlling the second switch to disconnect the first end of the inductor from the current sink.

15. The method as recited in claim 13, wherein when the first current is below the first threshold, further comprising controlling the first switch and the second switch in order to disconnect the first end of the inductor from the second supply voltage and the current sink.

16. The method as recited in claim 13, wherein the first supply voltage is lower than the second supply voltage.

17. The method as recited in claim 13, wherein at least one of the first threshold, second threshold and third threshold is programmable.

18. The method as recited in claim 13, wherein gain is programmable.

19. The method as recited in claim 13, further comprising supplying current to from the second supply voltage to a second load.

* * * * *